US012795780B2

(12) United States Patent
Mori et al.

(10) Patent No.: US 12,795,780 B2
(45) Date of Patent: Nov. 10, 2026

(54) CORE NETWORK DEVICE AND COMMUNICATION METHOD

(71) Applicants: DENSO CORPORATION, Kariya-city (JP); TOYOTA JIDOSHA KABUSHIKI KAISHA, Toyota (JP)

(72) Inventors: Misato Mori, Kariya-city (JP); Terufumi Takada, Kariya-city (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 221 days.

(21) Appl. No.: 18/415,362

(22) Filed: Jan. 17, 2024

(65) Prior Publication Data

US 2024/0155734 A1 May 9, 2024

Related U.S. Application Data

(63) Continuation of application No. PCT/JP2022/029086, filed on Jul. 28, 2022.

(30) Foreign Application Priority Data

Jul. 29, 2021 (JP) ................................ 2021-124664

(51) Int. Cl.
*H04W 76/40* (2018.01)
*H04W 76/10* (2018.01)

(52) U.S. Cl.
CPC ........... *H04W 76/40* (2018.02); *H04W 76/10* (2018.02)

(58) Field of Classification Search
CPC ..... H04W 76/00; H04W 76/10; H04W 76/40; H04W 4/06; H04W 72/30; H04L 12/18; H04L 49/201; H04L 65/00; H04L 65/611; H04L 47/70; H04L 70/72; H04L 67/141
See application file for complete search history.

(56) References Cited

U.S. PATENT DOCUMENTS

2019/0158985 A1* 5/2019 Dao ...................... H04W 28/04
2021/0105665 A1* 4/2021 Bennett ................. H04L 41/147
(Continued)

FOREIGN PATENT DOCUMENTS

WO 2021088051 A1 5/2021
WO WO-2022236448 A1 * 11/2022 ........... H04L 12/189

OTHER PUBLICATIONS

Zte et al., "Discussion and Proposal on the PCC Part of Configuration Procedure in Clause 7.1.1", Document S2-2104993, 3GPP TSG-WG SA2 Meeting #S2-145E, May 17-28, 2021.
(Continued)

*Primary Examiner* — Warner Wong
(74) *Attorney, Agent, or Firm* — Harness, Dickey & Pierce, P.L.C.

(57) ABSTRACT

A core network device which manages an MBS session, the core network device includes a control unit that checks whether or not it is necessary to make an interact regarding a policy to be applied to the MBS session to a first core network device that controls the policy upon configuring the MBS session; and a communication unit that acquires specific information for identifying the first core network device from a second core network device that discovers a function present in a core network when it is necessary to interact with the first core network device regarding the policy, wherein the control unit identifies the first core network device based on the specific information, and the communication unit transmits, to the identified first core network device, a message for making the interact regarding the policy to be applied to the MBS session.

3 Claims, 11 Drawing Sheets

(56) References Cited

U.S. PATENT DOCUMENTS

| | | | | |
|---|---|---|---|---|
| 2021/0120627 | A1* | 4/2021 | Ayaz | H04L 65/1069 |
| 2022/0263879 | A1 | 8/2022 | Li et al. | |
| 2022/0272498 | A1* | 8/2022 | Baek | H04L 12/1863 |
| 2023/0052505 | A1* | 2/2023 | Stockhammer | H04L 67/147 |
| 2023/0086661 | A1* | 3/2023 | Rönneke | H04L 65/611 |
| 2023/0096763 | A1* | 3/2023 | Vesely | H04W 76/11 370/312 |
| 2023/0209446 | A1* | 6/2023 | Kim | H04W 4/021 370/329 |
| 2023/0319511 | A1* | 10/2023 | Belling | H04W 4/06 370/312 |
| 2023/0388756 | A1* | 11/2023 | Jia | H04W 4/06 |
| 2023/0397233 | A1* | 12/2023 | Wu | H04W 76/40 |
| 2024/0147191 | A1* | 5/2024 | Ling | H04W 4/06 |
| 2024/0155734 | A1* | 5/2024 | Mori | H04W 76/40 |
| 2024/0430861 | A1* | 12/2024 | Ling | H04W 4/06 |
| 2025/0338090 | A1* | 10/2025 | Lu | H04W 12/75 |

OTHER PUBLICATIONS

Huawei et al., "TS 23.247: Initial MBS Session Configuration", Document S2-2104305, 3GPP TSG-WG SA2 Meeting #145E, May 17-28, 2021.

ZTE, "Modification Clause 7.3 on the Broadcast Session Management", Document S2-2104181, 3GPP TSG-WG SA2 Meeting #S2-145E, May 17-28, 2021.

Nokia et al., "PCF Service for Interactions Between MB-SMF and PCF", Document S2-2105170, 3GPP TSG-WG SA2 Meeting #144E, Apr. 12-16, 2021.

3GPP TSG SA, "Architectural Enhancements for 5G Multicast-Broadcast Services; Stage 2 (Release 17)", 3GPP TS 23.247 V1.0.0, Jun. 2021.

3GPP TS 38.300 V15.2.0 (Jun. 2018). 3rd Generation Partnership Project; Technical Specification Group Radio Access Network; NR; NR and NG-RAN Overall Description; Stage 2 (Release 15), pp. 1-87.

3GPP Ts 23.501 V15.2.0 (2018-06), 3rd Generation Partnership Project; Technical Specification Group Services and System Aspects; System Architecture for the 5G System; Stage 2 (Release 15), pp. 1-216.

Nokia, Nokia Shanghai-Bell, Tencent, NEF PCF interactions, 3GPP TSG-WG SA2, #145E e-Meeting, S2-2104019, May 10, 2021, Section 2, Elbonia, May 17-28, 2021, pp. 1-12.

China Telecom, Discussion the usage of the same PCF for AMF and SMF in 5GS, 3GPP TSG SA WG2 #136AH S2-2000330, Jan. 7, 2020, Section 6.3.7.1, Incheon, Korea, Jan. 13-17, 2020, pp. 1-9.

CATT, Ericsson, QoS Handling for Multicast and Broadcast services, 3GPP TSG SA WG2 Meeting #143E (e-meeting), S2-2101432, Mar. 10, 2021, Section 2, Elbonia, Feb 24-Mar. 9, 2020, pp. 1-2.

* cited by examiner

CORE NETWORK DEVICE AND COMMUNICATION METHOD

CROSS-REFERENCE TO RELATED APPLICATIONS

This application is a continuation application of International Patent Application No. PCT/JP2022/029086, filed Jul. 28, 2022, which designated the U.S. and claims the benefit of priority to Japanese Patent Application No. 2021-124664, filed on Jul. 29, 2021, the entire contents of which are incorporated herein by reference.

TECHNICAL FIELD

This disclosure relates to a core network device and a communication method.

BACKGROUND

In the 3rd Generation Partnership Project (3GPP) as an international standards organization, New Radio (NR) Release 15 as the 5th generation (5G) RAT (Radio Access Technology) is specified as a successor to Long Term Evolution (LTE) as the 3.9th generation RAT and LTE-Advanced as the 4th generation RAT, for example, Non-Patent Document 1: 3GPP TS 38.300 V15.2.0 (2018-06).

5G Core Network (5GC) Release 15 as the 5th generation CN is also specified as a successor to Evolved Packet Core (EPC) as the 4th generation CN (Core Network), for example, Non-Patent Document 2: 3GPP TS 23.501 V15.2.0 (2018-06).

SUMMARY

In the 3GPP, support of Multicast/Broadcast Service (MBS) as a transmission service of multicast data and/or broadcast data is currently considered. MBS in 5GC is also called SMBS or the like.

In 5GC, policy control in unicast communication (one-to-one communication) is realized by using a function called Policy Control Function (PCF). Even in the multicast and/or broadcast communication, it is also desired to perform policy control properly like in the unicast communication.

It is an object of the present disclosure to provide a core network device and a communication method capable of performing policy control properly in multicast and/or broadcast communication.

A core network device according to one aspect of the present disclosure is a core network device which manages a multicast/broadcast service (MBS) session, the core network device including: a control unit which checks whether or not it is necessary to make an interact regarding a policy to be applied to the MBS session to a first core network device that controls the policy upon configuring the MBS session; and a communication unit which acquires specific information for identifying the first core network device from a second core network device that discovers a function present in a core network when it is necessary to interact with the first core network device regarding the policy, wherein the control unit identifies the first core network device based on the specific information, and the communication unit transmits, to the identified first core network device, a message for marking the interact regarding the policy to be applied to the MBS session.

According to the present disclosure, there can be provided a core network device and a communication method capable of performing policy control properly in multicast and/or broadcast communication.

DETAILED DESCRIPTION

Figure 1:
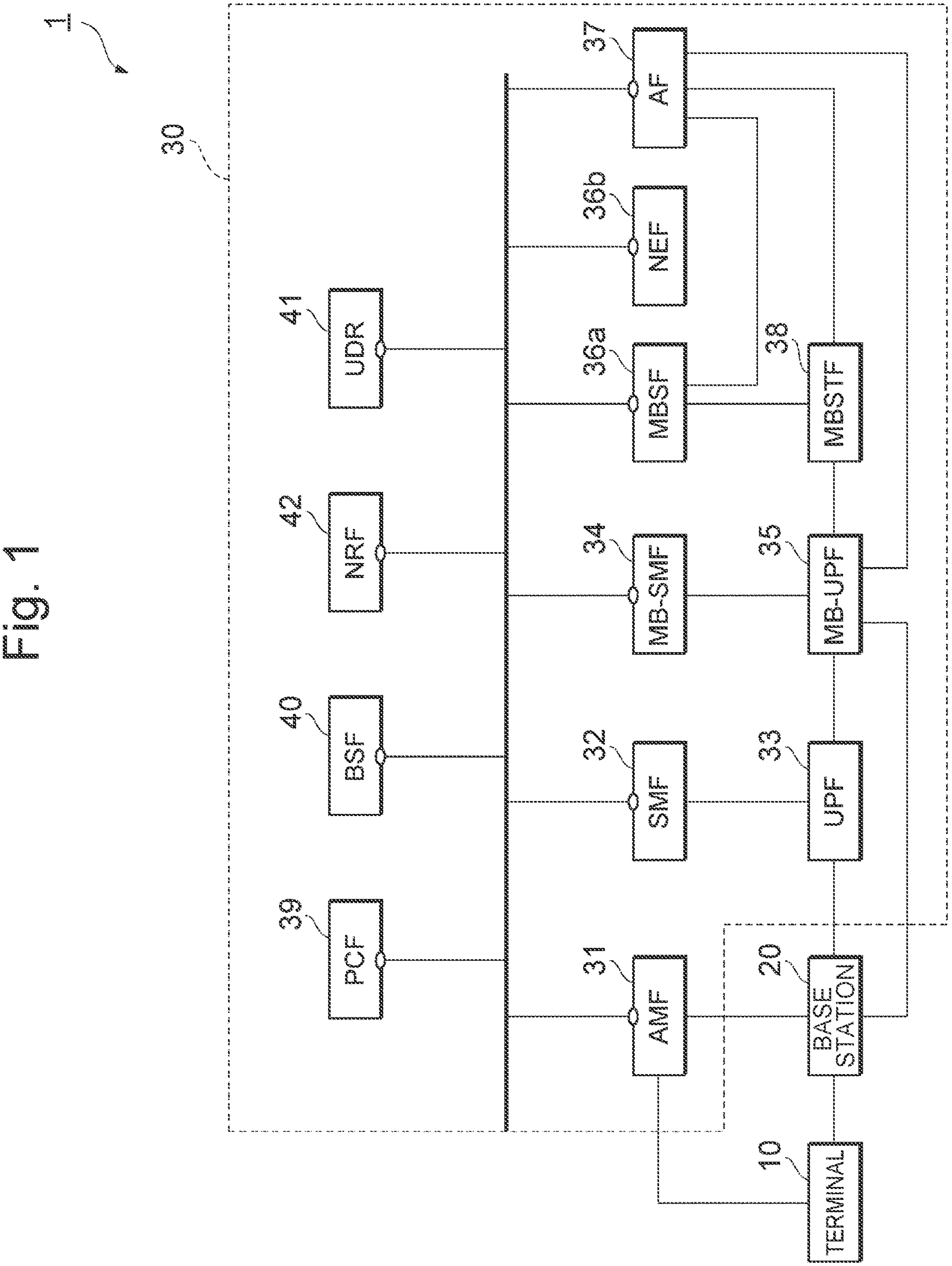
FIG. 1 is a diagram illustrating an example of an outline of a communication system according to the present embodiment.

The present embodiment will be described below with reference to the accompanying drawings. In order to facilitate the understanding of the description, the same reference numerals are given to the same components as much as possible to omit duplicate description.

FIG. 1 is a diagram illustrating an example of an outline of a communication system according to the present embodiment. As illustrated in FIG. 1, a communication system 1 includes a terminal 10, a base station 20, and a core network (CN) 30 to provide an MBS.

The terminal 10 is a given terminal or device such as a smartphone, a personal computer, an in-vehicle terminal, an in-vehicle device, a stationary device, or a telematics control unit (TCU). The terminal 10 may also be called user equipment (UE), a mobile station (MS), a terminal (User Terminal), a radio apparatus, a subscriber terminal, an access terminal, or the like. The terminal 10 may be of a mobile type or a fixed type.

The terminal 10 is configured to be communicable using, for example, at least one of LTE, LTE-Advanced, NR as RAT (Radio Access Technology) to the base station 20, but the terminal 10 is not limited thereto and may also be configured to be communicable using RAT of the sixth generation or later. Further, the terminal 10 may access the base station 20 through a non-3GPP access network such as Wi-Fi without being limited to an access network specified by the 3GPP (3GPP access network) mentioned above.

The base station 20 forms one or more cells to communicate with the terminal 10 using the cells. The base station 20 may also be called gNodeB(gNB), en-gNB, a radio access network (RAN), an access network (AN), a next generation radio access network (NG-RAN) node, a low-power node, a central unit (CU), a distributed unit (DU), gNB-DU, a remote radio head (RRH), or an integrated access and backhaul/backhauling (IAB) node. The base station 20 is not limited to one node and may be composed of two or more nodes (for example, a combination of a lower node such as DU and a higher node such as CU).

Note that the number of terminals 10 and the number of base stations 20 illustrated in FIG. 1 may be one or more. It is needless to say that one or more terminals 10 can be connected to one base station 20.

The CN 30 is, for example, 5GC, but the CN 30 is not limited thereto and may be EPC or any other core network of the sixth generation or later. The CN 30 contains various functions such as Access and Mobility Management Function (AMF) 31, Session Management Function (SMF) 32, User Plane Function (UPF) 33, Multicast/Broadcast (MB)-SMF 34, Multicast Broadcast (MB)-UPF 35, Network Exposure Function (NEF)/Multicast Broadcast Service Function (MBSF) 36, Application Function (AF) 37, Multicast Broadcast Service Transport Function (MBSTF) 38, PCF 39, Binding Support Function (BSF) 40, Unified Data Repository (UDR) 41, and Network Repository Function (NRF) 42. Note that these functions are collectively called network functions (NFs). Further, an identifiable instance of each function (namely, an actual situation of each NF actually operating in a physical or virtual device) may also be called an NF instance.

Note that the functions contained in the CN 30 are not limited to those illustrated in FIG. 1. In the CN 30, some of the functions illustrated in FIG. 1 may be omitted, or any unillustrated function may be contained. Further, the names of the functions illustrated in FIG. 1 are just illustrative examples, and other names may be used as long as they have equivalent or similar functions. A device in which one or more functions among the functions contained in the CN 30 are implemented may also be called a core network device. Further, the device is not necessarily limited to a physical device and may also be a virtual device realized on a virtual OS (Operating System).

The AMF 31 is a function to manage access and/or mobility of the terminal 10. The AMF 31 performs processing related to C plane (for example, registration management, connection management, mobility management), and the like. Further, the AMF 31 performs processing related to Non-access stratum (NAS) to transmit and/or receive a NAS message to and/or from the terminal 10.

The SMF 32 is a function to manage a session, which controls, for example, establishing, updating, releasing of the session, and the like.

The UPF 33 is a function to be a connection point to a data network (DN) (not illustrated), which performs, for example, routing, transfer of a packet, and the like. The UPF 33 transmits and receives data to and from the terminal 10 through a PDU session. The UPF 33 is a first user plane device for performing processing related to U plane.

The MB-SMF 34 is a function to manage a session for an MBS (hereinafter called the "MBS session"), which controls, for example, establishing, updating, releasing of the MBS session, and the like (including QoS control). The MBS session is also called a multicast broadcast (MB) session or the like. Further, the MB-SMF 34 configures the MB-UPF 35 for controlling a flow of MBS data based on a local policy held by the MB-SMF 34 or MBS policy rules provided from the PCF 39. Further, the MB-SMF 34 allocates and releases a temporary mobile group identifier (TMGI).

Note that joining in the MBS session may be accepted by a NAS message (for example, UL NAS MB Session Join Request) from the terminal 10 to the AMF 31, a request message (for example, MB Session Request) from the AMF 31 to the MB-SMF 34, a response message (for example, MB Session Response) from the MB-SMF 34 to the AMF 31 in response to the request message, and a NAS message (for example, DL NAS MB Session Join Accept) from the AMF 31 to the terminal 10 in response to the response message. A stream of the MBS session or MBS data may be identified by a given identifier (for example, MBS session ID).

The MBS session ID may be TMGI, or may be a source specific IP multicast address. Note that the source specific IP multicast address may be composed of two addresses of an IP unicast address (a source address for identifying a multicast service source) and an IP multicast address (a destination address for identifying the multicast service).

The MB-UPF 35 is a function to control a flow of MBS data from the MBSTF 38 or an unillustrated DN. Downstream MBS data from the MBSTF 38 or the unillustrated DN is transmitted from the MB-UPF 35 to the base station 20 or the UPF 33.

A NEF **36*b* provides an interface to the AF 37. An MBSF 36a selects an MB-SMF 34 that provides the MBS session, establishes communication between the AF 37 and the MB-SMF 34, and/or controls the MBSTF 38. The MBSF 36a can be collocated with the NEF 36*b*. In the following description, when the MBSF 36a is collocated with the NEF 36*b*, it is referred to as the NEF/MBSF 36**.

The AF 37 provides service information including a QoS request to the 5GC to request a multicast service or a broadcast service from the 5GC. The AF 37 may also be a function provided, for example, by a provider for providing contents.

The MBSTF 38 has a general packet transmission function to operate as an MBS data media anchor.

When dynamic policy and charging control (dynamic PCC) is required, the PCF 39 performs QoS handling in the MBS session. Further, the PCF 39 provides, to the MB-SMF 34, policy information (hereinafter called the "MBS policy") to be applied to the MBS session. Further, the dynamic PCC means that policy control and charging control are made changeable flexibly depending on the network status and/or service offering contents, rather than static (fixed) PCC. The dynamic PCC may also be called "dynamic policy control." Further, the PCF 39 may acquire the MBS policy from the UDR 41 present in the same PLMN (Public Land Mobile Network) as the PCF 39. Further, among PCFs 39, a PCF 39 that controls the policy of the MBS session may also be called MB (Multicast/Broadcast)-PCF.

The BSF 40 stores inside information related to PDU sessions (including the MBS session) (user identifier, DNN (Data Network Name), UE address, S-NSSAI (Single-Network Slice Selection Assistance Information), selected PCF address, and the like). The PCF 39 accesses the BSF 40 to register, update, and delete information stored in the BSF 40.

The UDR 41 provides policy data storing and searching functions to the PCF 39.

The NRF 42 discovers an NF present in the core network. Further, when an NF discovery request is received from an NF instance, the NRF 42 detects one or more NF instances that match the discovery request, and provides information related to the discovered one or more NF instances to the NF instance that transmitted the discovery request. The information related to the NF instances may be called an "NF profile," or may be called "information for identifying an NF." In the NF profile, plural pieces of information (for example, parameters) related to the NF instances are included, such as NF instance ID, NF type, network slice related ID (S-NSSAI, NSI ID (Network Slice Instance Identifier), or the like, FQDN (Fully Qualified Domain Name) or IP address of the NF, NF capacity information, NF priority information, NF instance location information, TAI (Tracking Area Identity), and NF load information. Note that the content of information included in the NF profile varies from NF to NF.

Here, "discovery" of an NF means that an NF instance in the CN 30 discovers another NF instance as a communication target (which may also be called to discover an NF instance candidate). The NF instance can interact with the NRF 42 regarding the NF to discover the NF. Further, "selection of an NF" means that the NF instance selects one or more NF instances from the discovered one or more NF instances. For example, the NF instance may select one or more NF instances based on information related to the one or more NF instances discovered by the NRF 42 and received from the NRF 42. The NF instance selection criteria may be configured in advance as local information in the NF, or determined based on the operator policy or the like. In 5GC, many NF instances exist. The NF can identify an NF instance as a communication target from among many NF instances by using a mechanism for NF discovery and selection.

MBS Data Transmission Method

In the above communication system 1, MBS data is delivered to a terminal 10 registered by a message (for example, a join or leave message) of a protocol for multicast distribution control (for example, Internet Group Management Protocol (IGMP) or Multicast Listener Discovery (MLD)). As MBS data transmission modes, it is considered to support an individual mode and a shared mode.

In the individual mode, MBS data (a single copy of MBS data) received in the CN 30 is transmitted to each terminal 10 through a PDU session for each terminal 10 (for example, a single-unicast PDU session with each terminal 10). The individual mode is also called a first transmission mode, Individual MBS Traffic delivery, 5GC Individual MBS traffic delivery method, or Ind-mode. The terminal 10 in the individual mode can receive the MBS data regardless of whether or not the base station 20 forming a serving cell supports the MBS.

In the shared mode, MBS data (a single copy of MBS data) received in the CN 30 is transmitted to the base station 20 through a shared transport with the base station 20, and transmitted from the base station 20 to subordinate terminals 10 by Point To Point (PTP) or Point To Multi-point (PTM). The shared mode is also called a second transmission mode, Shared MBS Traffic delivery, 5GC Shared MBS traffic delivery method, or Shared-mode. Each terminal 10 in the shared mode can receive the MBS data when the base station 20 forming the serving cell supports the MBS.

Figure 2:
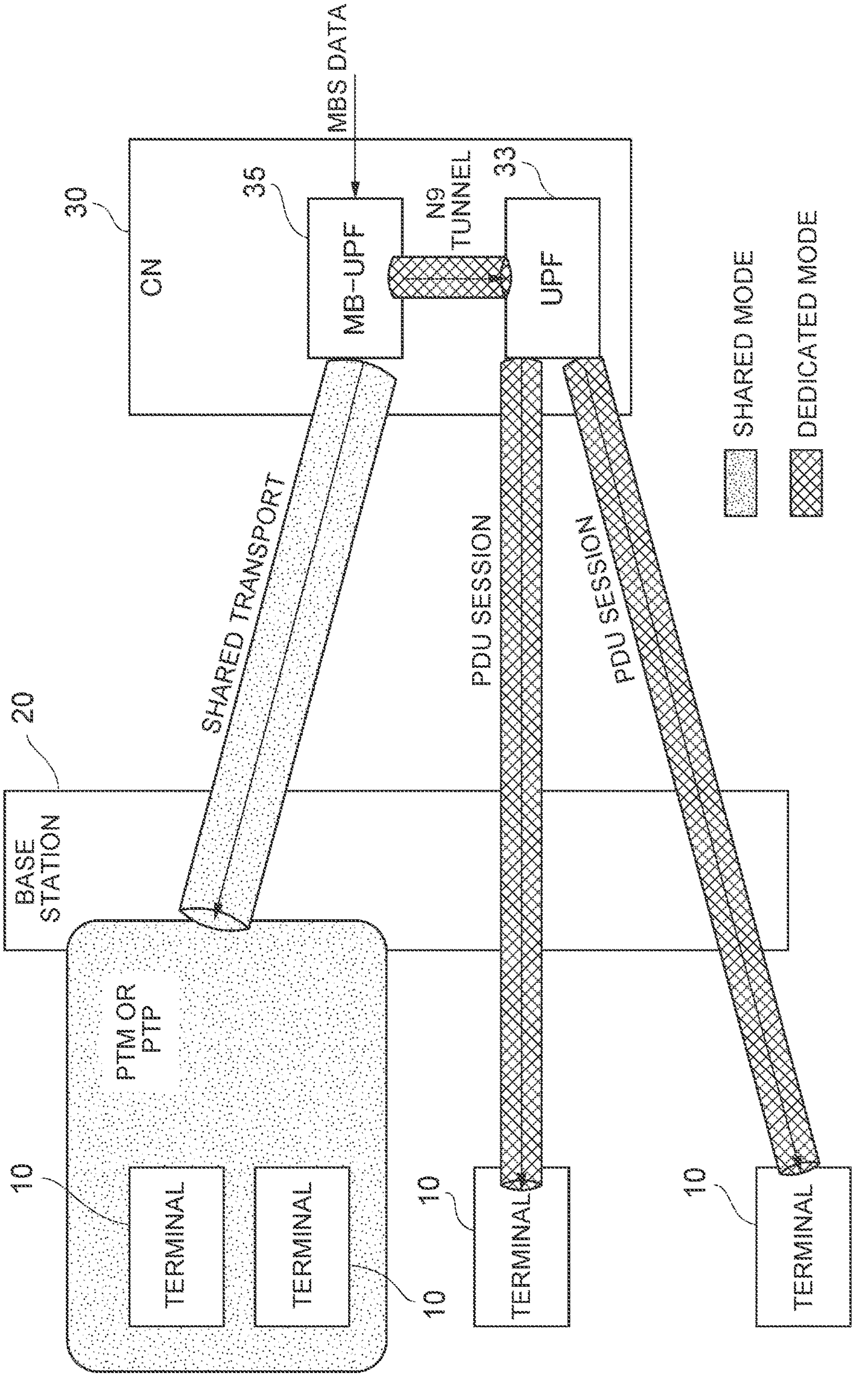
FIG. 2 is a diagram illustrating an example of MBS data transmission modes according to the present embodiment.

FIG. 2 is a diagram illustrating an example of MBS data transmission modes according to the present embodiment. As illustrated in FIG. 2, MBS data from an unillustrated DN is received by the MB-UPF 35 in the CN 30.

In the individual mode, the MB-UPF 35 transfers the received MBS data to the UPF 33 through N9 tunnel. Note that the N9 tunnel is a tunnel of N9 interface. The UPF 33 replicates the MBS data received from the MB-UPF 35 and transmits the MBS data to each terminal 10 through each PDU session configured individually with each terminal 10. In the individual mode, even when each terminal 10 is handed over to a base station 20 that does not support the MBS, the terminal 10 can continuously receive the MBS data.

On the other hand, in the shared mode, the MB-UPF 35 transmits the received MBS data to the base station 20 through a shared transport. The shared transport is a shared tunnel in the CN 30, which is also called a shared downlink CN tunnel or N3 tunnel. The base station 20 transmits the MBS data received from the MB-UPF 35 through the shared transport to each subordinate terminal 10 by PTM or PTP. In the shared mode, since pieces of MBS data for many terminals 10 are bundled into a single stream, the overhead of U plane in the CN 30 can be reduced compared to that in the individual mode.

MBS sessions include a broadcast session and a multicast session. In the multicast session, the transmission of MBS data (MBS traffic) is performed using both the individual mode and the shared mode. On the other hand, in the broadcast session, the transmission of MBS data (MBS traffic) is performed using only the shared mode.

Provision of MBS (MB Service Provisioning)

When providing an MBS, the CN 30 first performs MBS session configuration and makes a service announcement to each terminal 10, and then establishes an MBS session (MBS Session Establishment). At the stage of configuring the MBS session, information related to the MBS session is configured in each NF of 5GC, but MBS data cannot be transmitted because no user plane resource reservation is made for the base station 20. The service announcement means that the CN 30 notifies the terminal 10 of information necessary for receiving MBS data. When the MBS session is established, the resources of the 5GC and the base station 20 for the MBS session are reserved to make it possible to transmit the MBS data.

MBS Session Configuration Procedure

Figure 3:
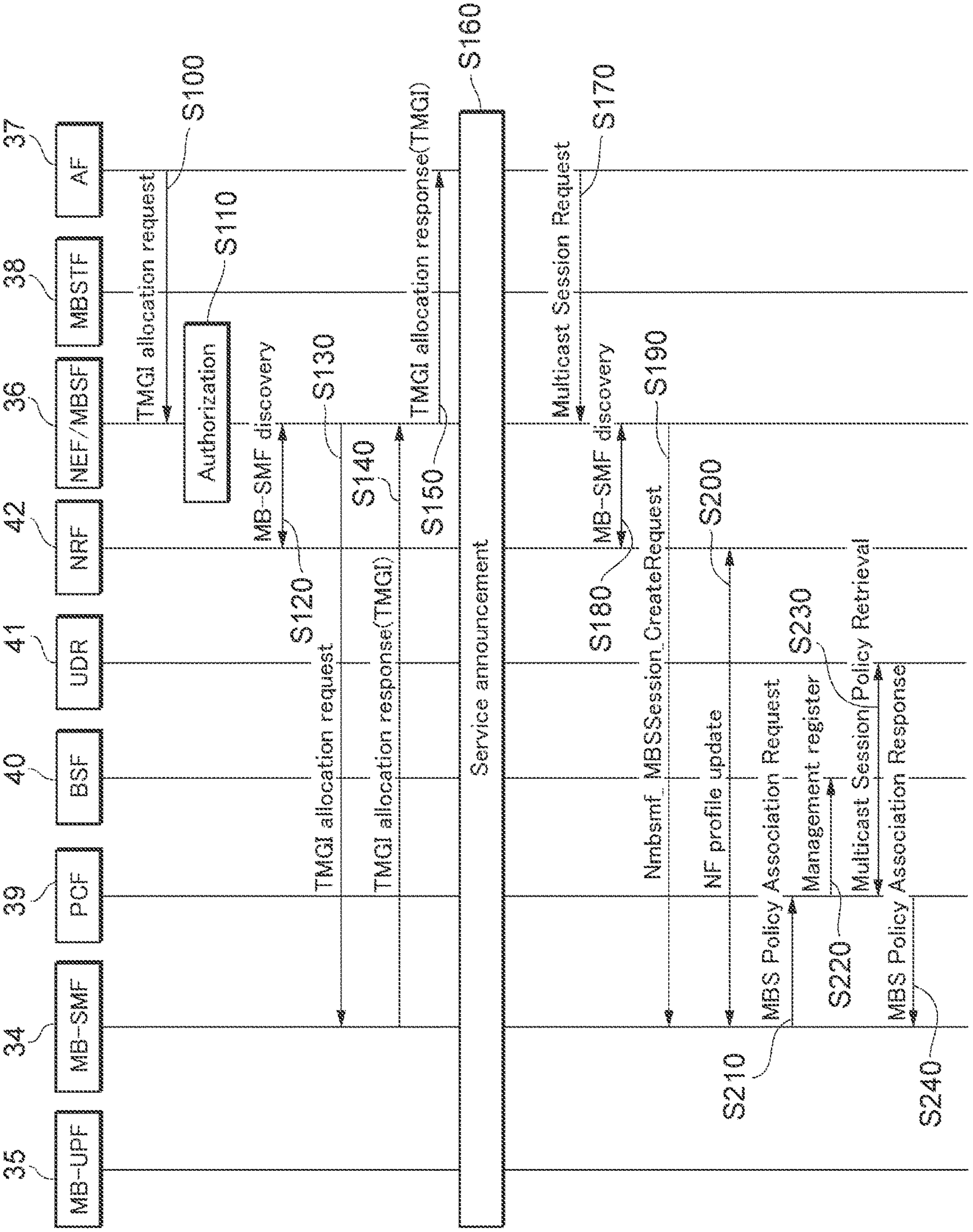
FIG. 3 is a diagram illustrating an example of an MBS session configuration procedure according to the present embodiment.
Figure 4:
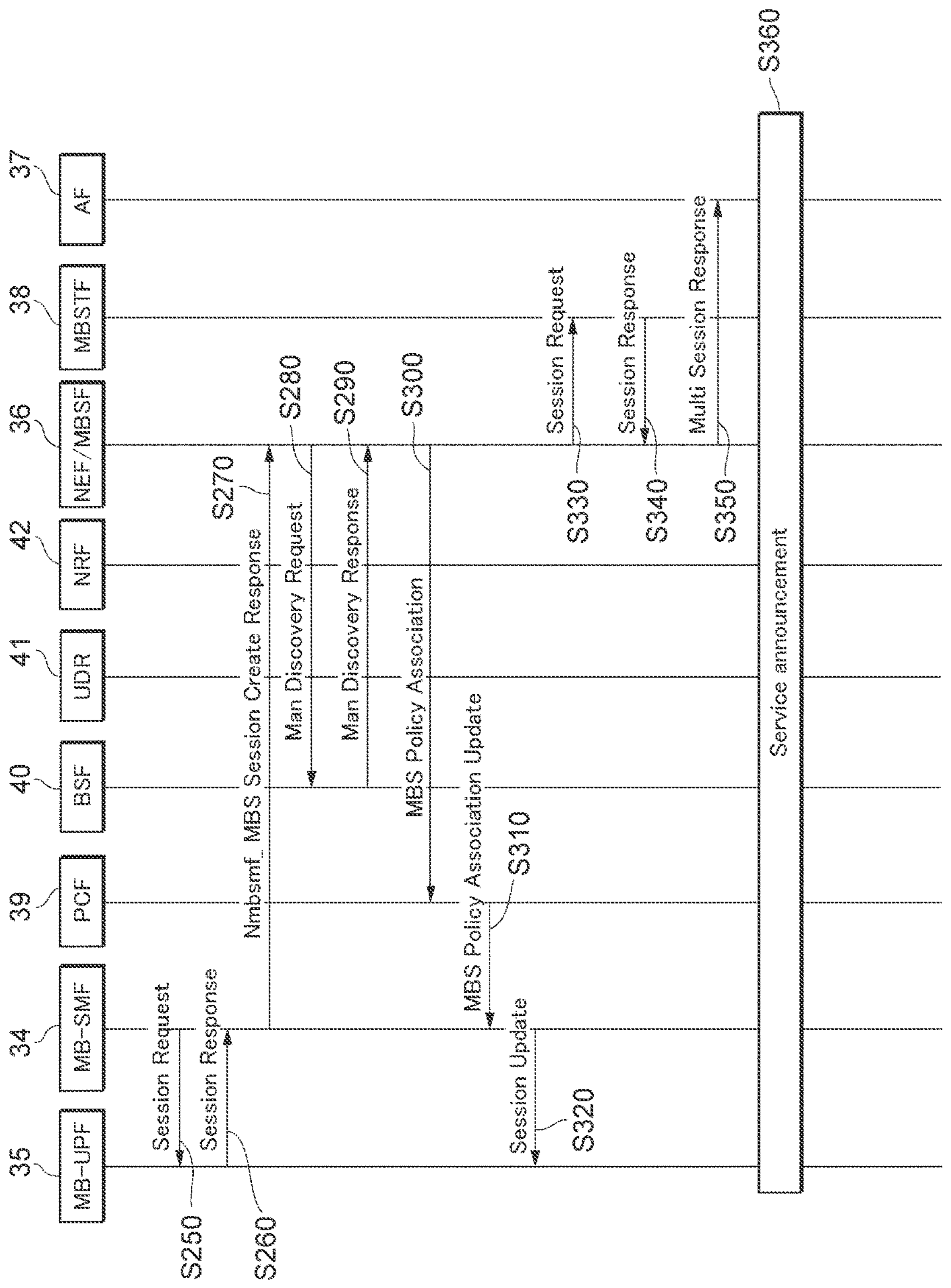
FIG. 4 is a diagram illustrating the example of the MBS session configuration procedure according to the present embodiment.

FIG. 3 and FIG. 4 are diagrams illustrating an example of an MBS session configuration procedure according to the present embodiment. The configuration of an MBS session is performed before a procedure for establishing the MBS session.

In FIG. 3, a processing procedure from step S100 to step S160 uses a TMGI as an MBS session ID, and is performed when it is necessary to allocate the TMGI in advance before the MBS session is configured. In other words, the processing procedure from step S100 to step S160 corresponds to a procedure for allocating the TMGI, and a processing procedure in and after step S170 corresponds to a procedure for configuring the MBS session.

In step S100, the AF 37 transmits, to the NEF/MBSF 36, a message for requesting TMGI allocation (for example, TMGI allocation request) to request the allocation of a TMGI for identifying a new MBS session.

In step S110, the NEF/MBSF 36 checks whether or not the AF 37 is authorized to perform the processing procedure in step S100 (Authorization). When the AF 37 is authorized, the processing procedure proceeds to step S120.

In step S120, the NEF/MBSF 36 makes an interact to the NRF 42 or discovers and selects an MB-SMF 34 based on the configuration of the MB-SMF 34 itself (local configuration).

For example, the NEF/MBSF 36 acquires, from the NRF 42, information on MB-SMF 34 candidates capable of performing the allocation of the TMGI (for example, a list of MB-SMF profiles) to select one MB-SMF 34 for requesting the allocation of the TMGI based on the acquired information.

In step S130, the NEF/MBSF 36 transmits a message for requesting the allocation of the TMGI (for example, TMGI allocation request) to the selected one MB-SMF 34.

In step S140, the MB-SMF 34 allocates the TMGI, and transmits, to the NEF/MBSF 36, a TMGI allocation response message (TMGI allocation response) by including the allocated TMGI therein.

In step S150, the NEF/MBSF 36 transmits, to the AF 37, the TMGI allocation response message (TMGI allocation response) by including therein the TMGI allocated by the MB-SMF 34.

In step S160, the AF 37 makes a service announcement to the terminal 10 (not illustrated). For example, the AF 37 notifies the terminal 10 of an MBS session ID (here, the allocated TMGI) and other information (MBS service area, session description information, etc.).

In step S170, the AF 37 transmits, to the NEF/MBSF 36, an MBS session request message (for example, MBS Session Request or Multicast Session Request) including information related to the MBS session (the MBS session ID, the service type (for example, either the broadcast service or the multicast service), MBS information, etc.). Note that when the TMGI is allocated as the MBS session ID by the processing procedure from step S100 to step S160, the TMGI is included in the MBS session request. The MBS information may also include MBS service area information, the start time and end time of the MBS, and the like. The NEF/MBSF 36 checks whether or not the AF 37 is authorized to perform the processing procedure of step S170 (Authorization), and when the AF 37 is authorized, the processing procedure proceeds to step S180.

In step S180, the NEF/MBSF 36 makes an interact to the NRF 42 or discovers and selects an MB-SMF 34 based on the configuration of the MB-SMF 34 itself. When the TMGI is allocated in the processing procedure of step S130, the NEF/MBSF 36 may select an MB-SMF 34 with the TMGI allocated thereto.

In step S190, the NEF/MBSF 36 transmits, to the selected MB-SMF 34, a message for creating an MBS session (for example, Nmbsmf_MBSSession_Create Request). In the message, an MBS session ID, a TMGI allocation instruction, a service type, the MBS service area information notified from the AF 37 in step S170, and the like are included.

In step S200, when the MBS session ID is a transmission source specific IP multicast address in step S190, the MB-SMF 34 allocates the TMGI. Further, the MB-SMF 34 may use the MBS session ID to update the NF profile of the MB-SMF 34 stored in the NRF 42.

In step S210, the MB-SMF 34 transmits, to the PCF 39, an MBS policy allocation request message (MBS Policy Association Request) including the MBS session ID.

In step S220, the PCF 39 transmits a message (for example, Management register) for registering, in the BSF 40, that the PCF 39 handles the multicast session. In the message, the MBS session ID and PCF identification information of the PCF 39 itself (for example, NF instance ID, PCF ID, FQDN and/or IP address of the PCF 39, and the like) are included.

In step S230, the PCF 39 accesses the UDR 41 to acquire an MBS policy configured in advance and associated with the MBS session ID.

In step S240, the PCF 39 transmits, to the MB-SMF 34, an MBS policy allocation response message (for example, MBS Policy Association Response) including the MBS policy associated with the MBS session ID and acquired in step S230. In the MBS policy, for example, information related to QoS to be applied to the MBS session, information related to the priority of the MBS service, information related to an area to which the MBS session is provided, information related to the date and time or a time zone to provide the MBS session and/or information related to a network slice to provide the MBS session, and the like may be included.

In step S250, the MB-SMF 34 selects an MB-UPF 35 and transmits, to the selected MB-UPF 35, a message (Session Request) for requesting, from the selected MB-UPF 35, a resource reservation for transmitting a user plane (that is, MBS data to be transmitted to the terminal 10). At this time, the MB-SMF 34 may transmit, to the MB-UPF 35, the message by including the MBS policy therein to notify the MB-UPF 35 of the MBS policy to be applied when the MBS data is transmitted to the terminal 10.

In step S260, the MB-UPF 35 transmits a session response message (for example, Session Response) to the MB-SMF 34.

In step S270, the MB-SMF 34 transmits an MBS session creation response message (for example, Nmbsmf_MBSSession_Create Response) to the NEF/MBSF 36. In the message, the MBS session ID and information indicating that the resource allocation for transmitting the MBS data was succeeded or failed are included.

In step S280, the NEF/MBSF 36 may transmit, to the BSF 40, a discovery request message (for example, Man Discovery Request) including the MBS session ID for discovering a PCF 39 that processes the MBS session having the MBS session ID notified in step S270.

In step S290, the BSF 40 transmits, to the NEF/MBSF 36, PCF identification information of the PCF 39 corresponding to the notified MBS session ID. The PCF identification information transmitted to the NEF/MBSF 36 is the PCF identification information registered in the BSF 40 in the processing procedure of step S220 in FIG. 3.

In step S300, the NEF/MBSF 36 may transmit, to the PCF 39 notified in step S290, a message (for example, MBS Policy Association) for requesting the allocation of the MBS policy.

In step S310, the PCF 39 may transmit, to the MB-SMF 34, a message (for example, MBS Policy Association Update) for requesting updating of the MBS policy including the MBS policy after being updated as needed.

In step S320, when the MBS policy is updated, the MB-SMF 34 may transmit, to the MB-UPF 35, a message (for example, Session Update) for requesting updating of the MBS session as needed.

In step S330, the NEF/MBSF 36 may transmit, to the MBSTF 38, a session request message (for example, Session Request) as needed.

In step S340, the MBSTF 38 may notify the NEF/MBSF 36 of a session response message (for example, Session Response) as needed.

In step S350, the NEF/MBSF 36 transmits, to the AF 37, a session response message (Multi Session Response) including various parameters (the MBS session ID, etc.).

In step S360, the AF 37 makes a service announcement to the terminal 10 (not illustrated).

Processing Procedure Related to Discovery and Selection of PCF

Subsequently, a specific processing procedure upon discovery and selection of a PCF 39 in the MBS session configuration procedure will be described. In the following description, the same processing steps as those in the description of FIG. 3 and FIG. 4 are given the same reference numerals, and the description thereof may be omitted.

Processing Procedure 1-1

In processing procedure 1-1, a PCF 39 is discovered and selected during the processing procedure for allocating the TMGI.

Figure 5:
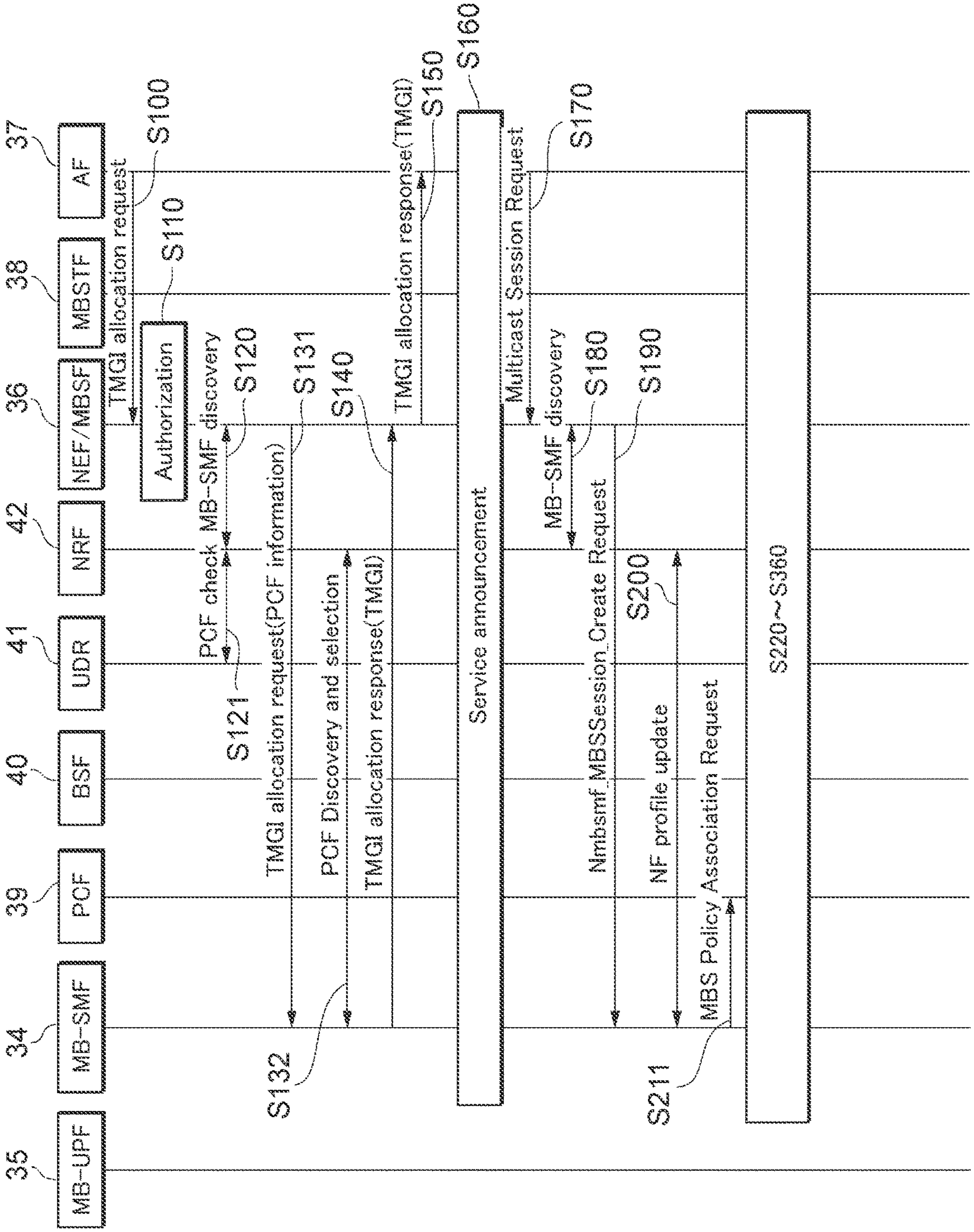
FIG. 5 is a sequence diagram illustrating an example of processing procedure 1-1 related to the discovery and selection of a PCF.

FIG. 5 is a sequence diagram illustrating an example of the processing procedure 1-1 related to the discovery and selection of a PCF.

In step S120, the NEF/MBSF 36 makes an interact to the NRF 42 or discovers and selects an MB-SMF 34 based on the configuration of the MB-SMF 34 itself (local configuration).

In step S121, the NRF 42 that received the interact from the NEF/MBSF 36 accesses the UDR 41 to check whether or not it is necessary to interact with the PCF 39 regarding the MBS policy upon configuring the MBS session to which the TMGI is allocated. The NRF 42 notifies the NEF/MBSF 36 of the checking result (that is, information indicating whether or not it is necessary to interact with the PCF 39 regarding the MBS policy).

In step S131, the NEF/MBSF 36 transmits, to selected one MB-SMF 34, a message (for example, TMGI allocation request) for requesting the allocation of the TMGI. When receiving, from the NRF 42, the checking result that it is necessary to interact with the PCF 39 regarding the MBS policy, the NEF/MBSF 36 includes, in the message, information indicating that it is necessary to interact with the PCF 39 regarding the MBS policy (hereinafter called "PCF usage information" or "PCF information"). On the other hand, when receiving, from the NRF 42, the checking result that it is not necessary to interact with the PCF 39 regarding the MBS policy, the NEF/MBSF 36 transmits the message without including the "PCF usage information" therein.

In step S132, when the PCF usage information is included in the message for requesting the allocation of the TMGI, the MB-SMF 34 recognizes that it is necessary to interact with the PCF 39 regarding the MBS policy. When the PCF usage information is not included in the message for requesting the allocation of the TMGI, the MB-SMF 34 recognizes that it is not necessary to interact with the PCF 39 regarding the MBS policy.

When recognizing that it is necessary to interact with the PCF 39 regarding the MBS policy, the MB-SMF 34 makes an interact to the NRF 42 to discover and select a PCF 39. For example, the MB-SMF 34 may receive, from the NRF 42, NF profiles of one or more PCFs 39 discovered by the NRF 42 (for example, a list of NF profiles of PCFs 39 as candidates) to select one PCF 39 that performs policy control of an MBS session to be configured based on the received one or more NF profiles and information locally configured in the MB-SMF 34, or based on the received one or more NF profiles and an operator policy. The locally configured information or the operator policy may define each NF profile used to select each PCF 39, and define a method or criterion of selecting a PCF 39 using the NF profile.

For example, in each NF profile about each PCF 39, information indicative of an AF 37 associated with the PCF 39 is included, and the MB-SMF 34 may select a PCF 39 associated with an AF 37 that required the configuration of the MBS session from among a plurality of PCFs 39 discovered by the NRF 42. In other words, a method of "selecting a PCF 39 associated with an AF 37 that required the configuration of the MBS session" may be defined in the locally configured information or the operator policy.

Further, for example, in each NF profile about each PCF 39, information indicative of the service type of MBS (broadcast service or multicast service) associated with the PCF 39 is included, and the MB-SMF 34 may select a PCF 39 associated with the service type required in an MBS session to be configured. In other words, in the locally configured information or the operator policy, a method of "selecting a PCF 39 associated with the service type required in the MBS session to be configured" may be defined.

Upon completion of the selection of the PCF 39, the MB-SMF 34 stores PCF identification information of the selected PCF 39 (for example, NF instance ID, PCF ID, FQDN and/or IP address of the PCF 39, and the like).

In step S211, the MB-SMF 34 transmits, to the PCF 39 selected in the processing procedure of step S131, an MBS policy allocation request message (MBS Policy Association Request) including the MBS session ID.

Processing Procedure 1-2

In proceeding procedure 1-2, a PCF 39 is discovered and selected during the processing procedure for configuring the MBS session.

Figure 6:
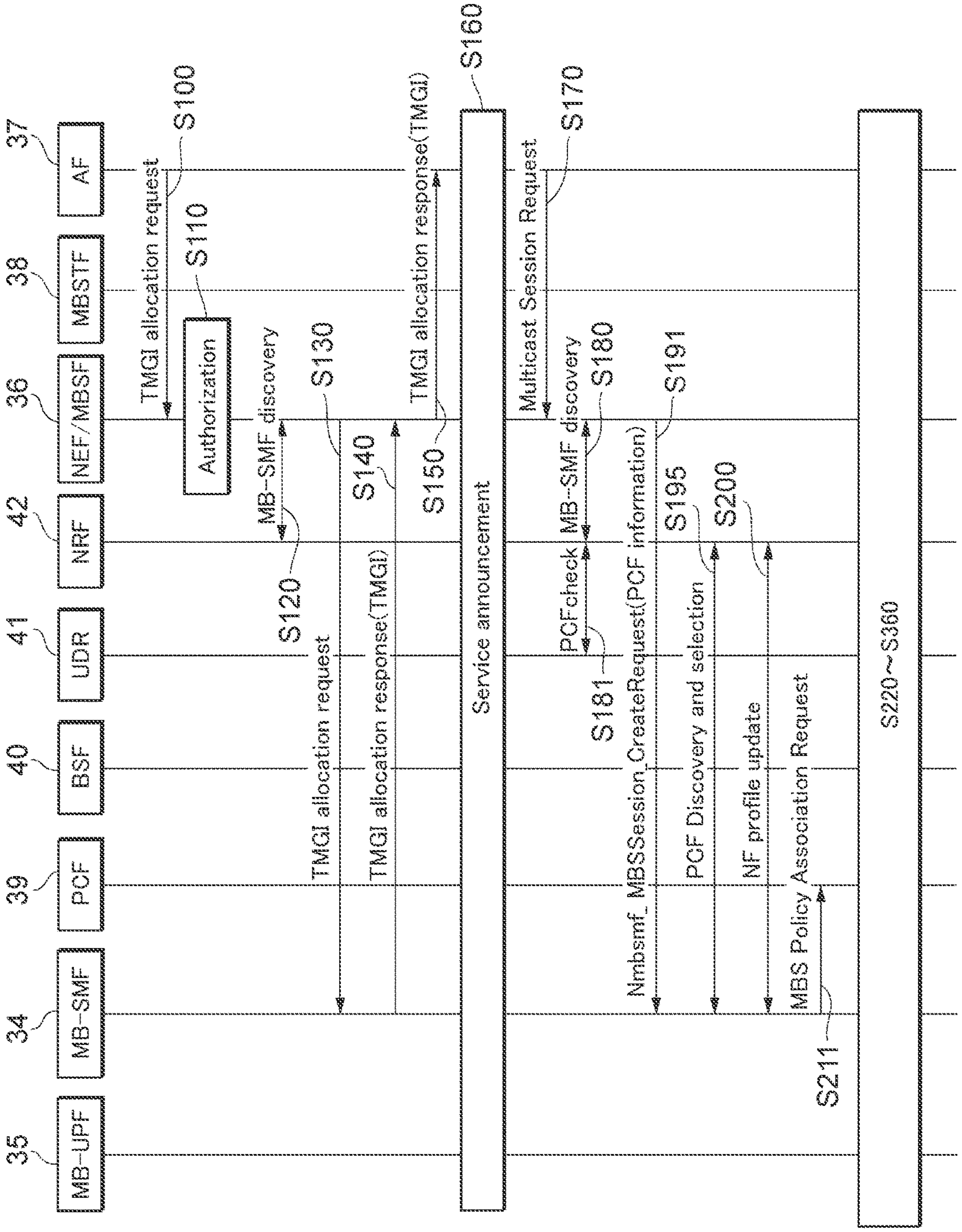
FIG. 6 is a sequence diagram illustrating processing procedure 1-2 related to the discovery and selection of a PCF.

FIG. 6 is a sequence diagram illustrating an example of the processing procedure 1-2 related to the discovery and selection of a PCF.

In step S180, the NEF/MBSF 36 makes an interact to the NRF 42 or discovers and selects an MB-SMF 34 based on the configuration of the MB-SMF 34 itself.

In step S181, the NRF 42 that received the interact from the NEF/MBSF 36 accesses the UDR 41 to check whether or not it is necessary to interact with the PCF 39 regarding the MBS policy upon configuring the MBS session to which the TMGI is allocated. The NRF 42 notifies the NEF/MBSF 36 of the checking result (that is, information indicating whether or not it is necessary to interact with the PCF 39 regarding the MBS policy).

In step S191, the NEF/MBSF 36 transmits, to the selected MB-SMF 34, a message for requesting the creation of an MBS session (for example, Nmbsmf_MBSSession_Create Request). In the message, the MBS session ID, the TMGI allocation instruction, the service type, the MBS service area information notified from the AF 37 in step S170, and the like are included. Further, when receiving, from the NRF 42, the checking result that it is necessary to interact with the PCF 39 regarding the MBS policy, the NEF/MBSF 36 includes, in the message, information indicating that it is necessary to interact with the PCF 39 regarding the MBS policy (hereinafter called "PCF usage information" or "PCF information"). On the other hand, when receiving, from the NRF 42, the checking result that it is not necessary to interact with the PCF 39 regarding the MBS policy, the NEF/MBSF 36 transmits the message without including the "PCF usage information" therein.

In step S195, when the PCF usage information is included in the message for requesting the creation of the MBS session, the MB-SMF 34 recognizes that it is necessary to interact with the PCF 39 regarding the MBS policy. When the PCF usage information is not included in the message for requesting the creation of the MBS session, the MB-SMF 34 recognizes that it is not necessary to interact with the PCF 39 regarding the MBS policy. When recognizing that it is necessary to interact with the PCF 39 regarding the MBS policy, the MB-SMF 34 makes an interact to the NRF 42 to discover and select a PCF 39. Since the method of discovering and selecting the PCF 39 is the same as that in the processing procedure of step S132 in FIG. 5, the description thereof will be omitted. Upon completion of the selection of the PCF 39, the MB-SMF 34 stores PCF identification information of the selected PCF 39 (for example, NF instance ID, PCF ID, FQDN and/or IP address of the PCF 39, etc.). Further, the MB-SMF 34 may store the PCF identification information of the selected PCF 39, for example, in an MBS session context.

Since the processing procedure of step S211 is the same as that in FIG. 5, the description thereof will be omitted.

Processing Procedure 2

In processing procedure 2, a PCF 39 is discovered and selected during the processing procedure for configuring the MBS session. However, unlike the processing procedure 1-1 and the processing procedure 1-2, the MB-SMF 34, not the NRF 42, checks whether or not it is necessary to interact with the PCF 39 regarding the MBS policy.

Figure 7:
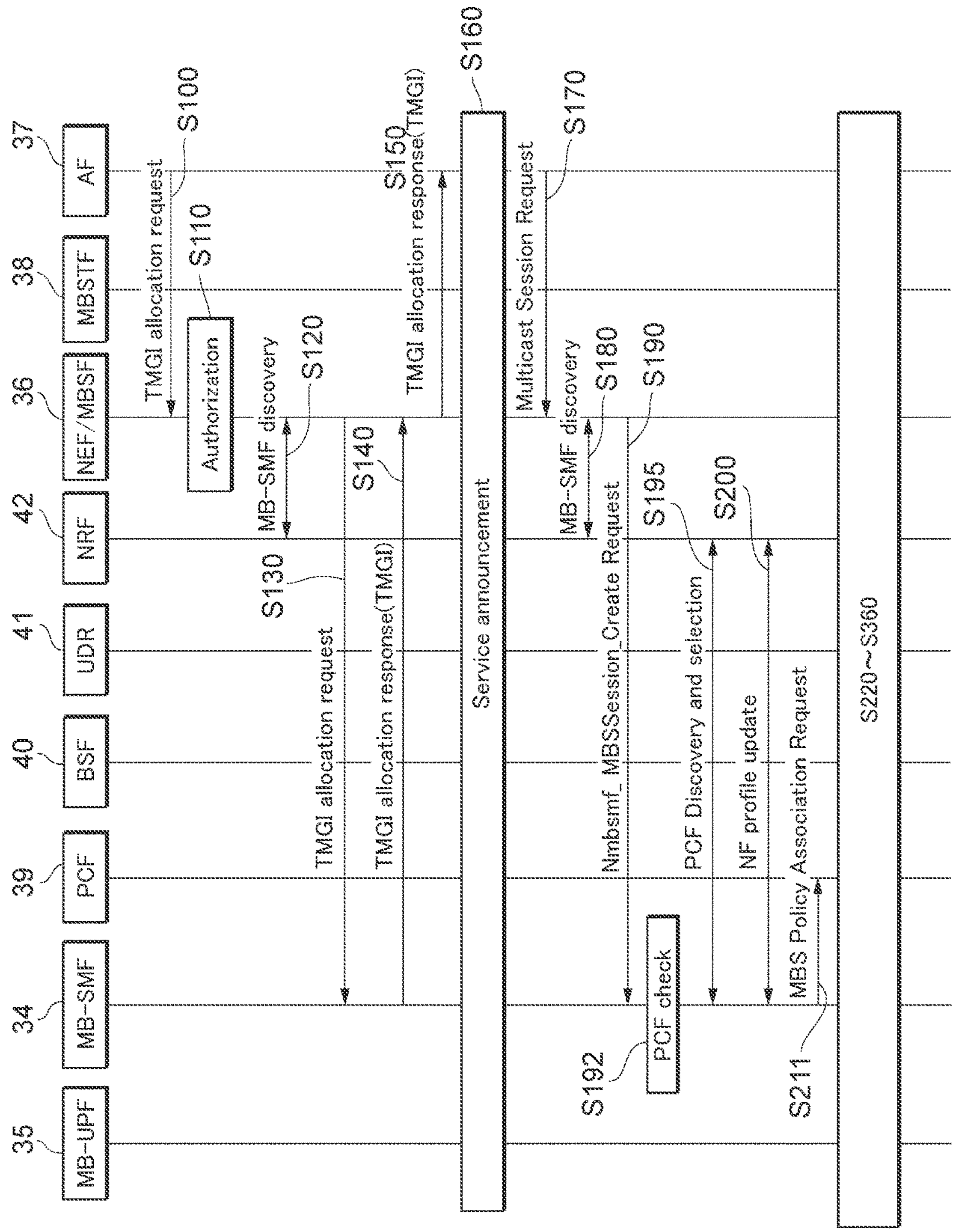
FIG. 7 is a sequence diagram illustrating an example of processing procedure 2 related to the discovery and selection of a PCF.
Figure 8:
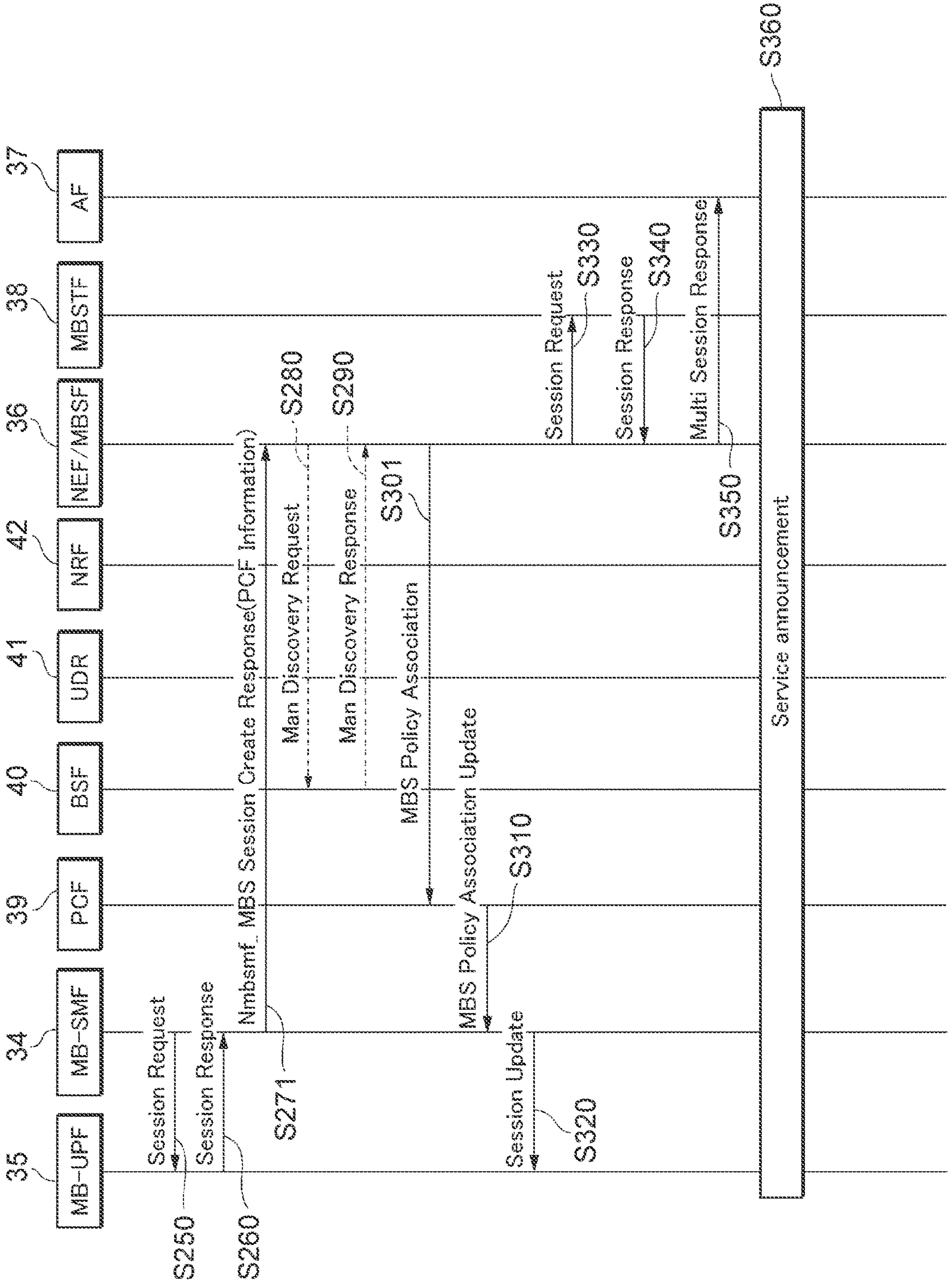
FIG. 8 is a sequence diagram illustrating the example of the processing procedure 2 related to the discovery and selection of a PCF.

FIG. 7 and FIG. 8 are sequence diagrams illustrating an example of the processing procedure 2 related to the discovery and selection of a PCF.

In step S192, the MB-SMF 34 checks whether or not it is necessary to interact with the PCF 39 regarding the MBS policy upon configuring the MBS session. For example, when information related to the MBS policy is configured in the MB-SMF 34 itself, the MB-SMF 34 may recognize that it is not necessary to interact with the PCF 39 regarding the MBS policy. Further, when information related to the MBS policy is not configured in the MB-SMF 34, the MB-SMF 34 may recognize that it is necessary to interact with the PCF 39 regarding the MBS policy.

Further, for example, when information indicating that it is necessary to perform the dynamic PCC is configured in the MB-SMF 34, the MB-SMF 34 may recognize that it is necessary to interact with the PCF 39 regarding the MBS policy. Further, when information indicating that it is necessary to perform the dynamic PCC is not configured in the MB-SMF 34, the MB-SMF 34 may recognize that it is not necessary to interact with the PCF 39 regarding the MBS policy.

Since the processing procedure of step S195 and step S211 is the same as that in FIG. 5 and FIG. 6, the description thereof will be omitted.

In step S271, the MB-SMF 34 transmits, to the NEF/MBSF 36, an MBS session creation response message (for example, Nmbsmf_MBSSession_Create Response). In the message, the MBS session ID, information indicating that the resource allocation for transmitting the MBS data was succeeded or failed, and PCF identification information of the PCF 39 selected in the processing procedure of step S195 are included. The PCF identification information may be, for example, the NF instance ID, PCF ID, FQDN and/or IP address of the PCF 39, or the like.

Note that since the NEF/MBSF 36 receives the PCF identification information of the PCF 39 in the processing procedure of step S271, the processing procedure of step S280 and step S290 may be omitted.

In step S301, the NEF/MBSF 36 may transmit a message (for example, MBS Policy Association) for requesting the allocation of the MBS policy to the PCF 39 to which the message is notified in step S271.

Modifications of Processing Procedure Related to Discovery and Selection of PCF

The PCF usage information may also be information indicative of two choices of whether or not it is necessary to interact with the PCF 39 regarding the MBS policy. In this case, the PCF usage notice may be, for example, one bit of information. For example, the PCF usage notice may be "1" when it is necessary to interact with the PCF 39, and "0" when it is not necessary to interact with the PCF 39.

In the processing procedure of step S120 and step S180 in FIG. 5, when checking that it is necessary to interact with the PCF 39 regarding the MBS policy, the NEF/MBSF 36 may interact with the NRF 42 to discovery and select a PCF 39. Further, the NEF/MBSF 36 may transmit, to the MB-SMF 34, the message for requesting the allocation of the TMGI by including therein information related to the selected PCF 39 instead of (or in addition to) the PCF usage information. In other words, the discovery and selection of the PCF 39 may be performed by the NEF/MBSF 36 rather than the MB-SMF 34. The MB-SMF 34 can omit the processing procedure of step S132 or step S195.

Hardware Configuration

Figure 9:
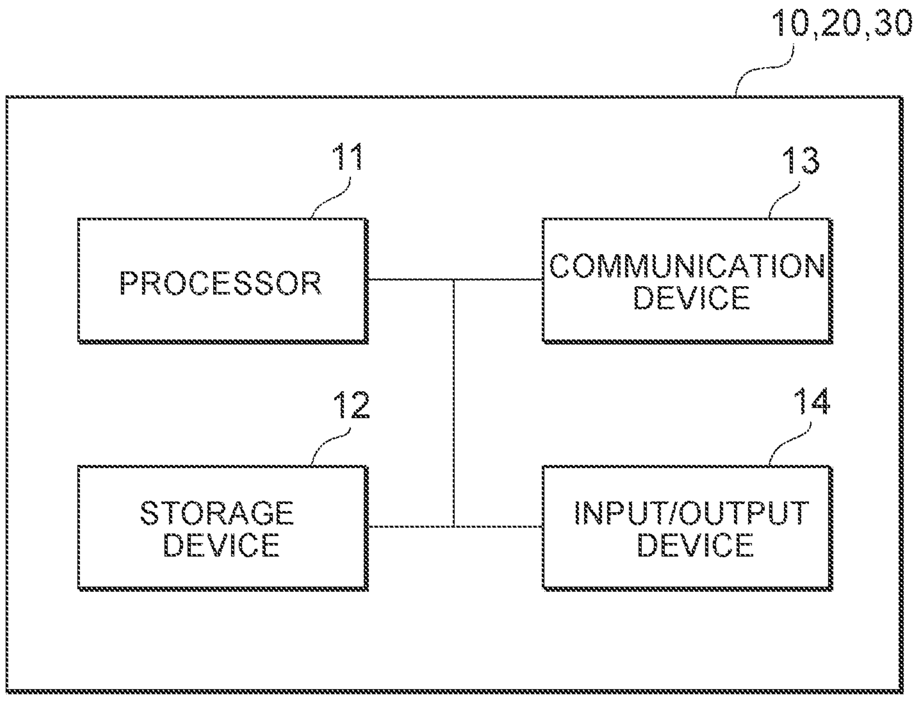
FIG. 9 is a diagram illustrating an example of the hardware configuration of each equipment in the communication system according to the present embodiment.

FIG. 9 is a diagram illustrating an example of the hardware configuration of each equipment in the communication system according to the present embodiment. Each equipment in the communication system 1 may be any device illustrated in FIG. 1, which is a core network device, for example, having any of the functions in the terminal 10, the base station 20, and the CN 30.

Each equipment in the communication system 1 includes a processor 11, a storage device 12, a communication device 13 that performs wired or wireless communication, and an input/output device 14 that accepts various input operations and outputs various information.

The processor 11 is, for example, a CPU (Central Processing Unit) to control each equipment in the communication system 1. The processor 11 may read a program from the storage device 12 to perform various processing described in the present embodiment. Each equipment in the communication system 1 may also be composed of one or more processors 11. Further, each equipment concerned may be called a computer.

The storage device 12 is, for example, composed of a memory and storages such as an HDD (Hard Disk Drive) and/or an SSD (Solid State Drive). The storage device 12 may also store various information (for example, programs executed by the processor 11, etc.) necessary to perform processing by the processor 11.

The communication device 13 is a device for performing communication through wired and/or wireless networks, which may include, for example, a network card, a communication module, a chip, an antenna, and the like. Further, an amplifier, an RF (Radio Frequency) device for performing processing on radio signals, and a BB (BaseBand) device for performing baseband signal processing may be included in the communication device 13.

The RF device performs D/A conversion, modulation, frequency conversion, power amplification, and the like on a digital baseband signal, for example, received from the BB device to generate a radio signal to be transmitted from the antenna A. Further, the RF device performs frequency conversion, demodulation, ND conversion, and the like on a radio signal received from the antenna to generate and transmit a digital baseband signal to the BB device. The BB device performs processing for converting the digital baseband signal to a packet and processing for converting the packet to a digital baseband signal.

The input/output device 14 includes input devices such as a keyboard, a touch panel, a mouse and/or a microphone, and output devices such as a display and/or a speaker.

The hardware configuration described above is just an example. In each equipment inside the wireless communication system 1, part of hardware illustrated in FIG. 9 may be omitted, or any other hardware unillustrated in FIG. 9 may be included. Further, the hardware illustrated in FIG. 9 may be configured by one or more chips.

Functional Block Configuration

MB-SMF

Figure 10:
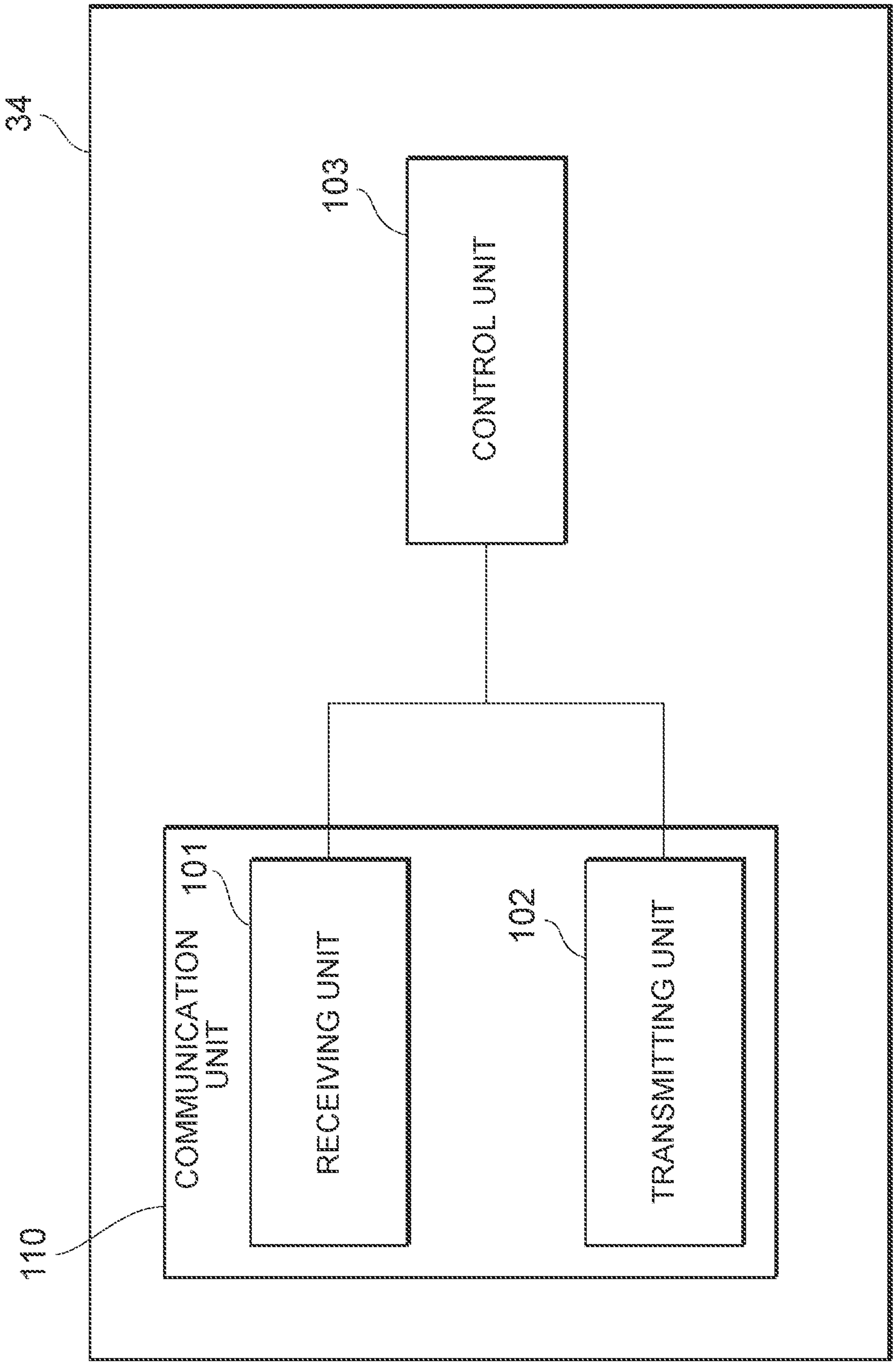
FIG. 10 is a diagram illustrating an example of the functional block configuration of a core network device according to the present embodiment.

FIG. 10 is a diagram illustrating an example of the functional block configuration of a core network device according to the present embodiment. In FIG. 10, the functional block configuration of the MB-SMF 34 is illustrated, but any other core network device having a function other than that of the MB-SMF 34 may also have a similar functional block configuration. The MB-SMF 34 includes a receiving unit 101, a transmitting unit 102, and a control unit 103. Further, the receiving unit 101 and the transmitting unit 102 are collectively called a communication unit 110.

Note that all or some of the functions implemented by the receiving unit 101 and the transmitting unit 102 can be realized by using the communication device 13. Further, all or some of the functions implemented by the receiving unit 101 and the transmitting unit 102, and the function of the control unit 103 can be realized by the processor 11 executing a program stored in the storage device 12. Further, the program can be stored on a storage medium. The storage medium with the program stored thereon may be a non-transitory computer readable medium. The non-transitory storage medium is not particularly limited but may be a storage medium such as a USB memory or a CD-ROM.

The communication unit 110 transmits and receives various messages to and from other functions (NFs) in the terminal 10, the base station 20, or the CN 30. The receiving unit 101 receives various messages from other functions in the terminal 10, the base station 20, or the CN 30. The transmitting unit 102 transmits various messages to other functions in the terminal 10, the base station 20, or the CN 30.

The control unit 103 performs various controls related to the function implemented in the MB-SMF 34. Further, upon configuring the MBS session, the control unit 103 checks whether or not it is necessary to make an interact regarding the MBS policy to the PCF 39 that controls the MBS policy. Note that the PCF 39 is an example of a first core network device that controls the MBS policy. Further, a policy to be applied to the MBS session is an example of the MBS policy.

Further, upon configuring the MBS session, the communication unit 110 may receive, from the NEF/MBSF 36, PCF usage information indicating that it is necessary to interact with the PCF 39 regarding the MBS policy. Here, the NEF/MBSF 36 is an example of a third core network device. Further, the PCF usage information is an example of first given information.

The PCF usage information may be included in a message transmitted from the NEF/MBSF 36 to request the allocation of the TMGI. In other words, the communication unit 110 may receive the PCF usage information included in the message transmitted from the NEF/MBSF 36 to request the allocation of the TMGI (for example, step S131 in FIG. 5).

Further, the PCF usage information may be included in a message transmitted from the NEF/MBSF 36 to request the creation of the MBS session. In other words, the communication unit 110 may receive the PCF usage information included in the message transmitted from the NEF/MBSF 36 to request the creation of the MBS session (for example, step S191 in FIG. 6).

Further, when the PCF usage information is included in the message for requesting the allocation of the TMGI or the message for requesting the creation of the MBS session received by the communication unit 110, the control unit 103 may recognize that it is necessary to interact with the PCF 39 regarding the MBS policy. Further, when the PCF usage information is not included in the message for requesting the allocation of the TMGI or the message for requesting the creation of the MBS session received by the communication unit 110, the control unit 103 may recognize that it is not necessary to interact with the PCF 39 regarding the MBS policy (step S131 in FIG. 5, step S195 in FIG. 6).

Further, when information related to the MBS policy is not configured in the MB-SMF 34 itself, the control unit 103 may recognize that it is necessary to interact with the PCF 39 regarding the MBS policy. On the other hand, when information related to the MBS policy is configured in the MB-SMF 34 itself, the control unit 103 may recognize that it is not necessary to interact with the PCF 39 regarding the MBS policy (step S192 in FIG. 7).

Further, when information indicating that it is necessary to perform dynamic policy control is configured in the MB-SMF 34 itself, the control unit 103 may recognize that it is necessary to interact with the PCF 39 regarding the MBS policy. On the other hand, when information indicating that it is necessary to perform dynamic policy control is not configured in the MB-SMF 34 itself, the control unit 103 may recognize that it is not necessary to interact with the PCF 39 regarding the MBS policy (step S192 in FIG. 7). Here, the information indicating that it is necessary to perform dynamic policy control is an example of a second given information.

When it is necessary to interact with the PCF 39 regarding the MBS policy (when it is recognized by the control unit 103 that it is necessary to make an interact regarding the MBS policy to the PCF 39 that controls the policy concerned), the communication unit 110 acquires, from the NRF 42, specific information for identifying the PCF 39. Here, the NRF 42 is an example of a second core network device for discovering a function present in the core network. Further, information (for example, NF profiles) related to NF instances of one or more PCFs 39 is an example of the specific information.

Further, the control unit 103 identifies a PCF 39 based on the acquired specific information. The fact that the control unit 103 identifies a PCF 39 based on the acquired specific information may also mean that the control unit 103 discovers and selects a PCF 39 based on the specific information.

The communication unit 110 transmits, to the PCF 39 identified by the control unit 103, a message for making an interact regarding the MBS policy.

NEF/MBSF

Figure 11:
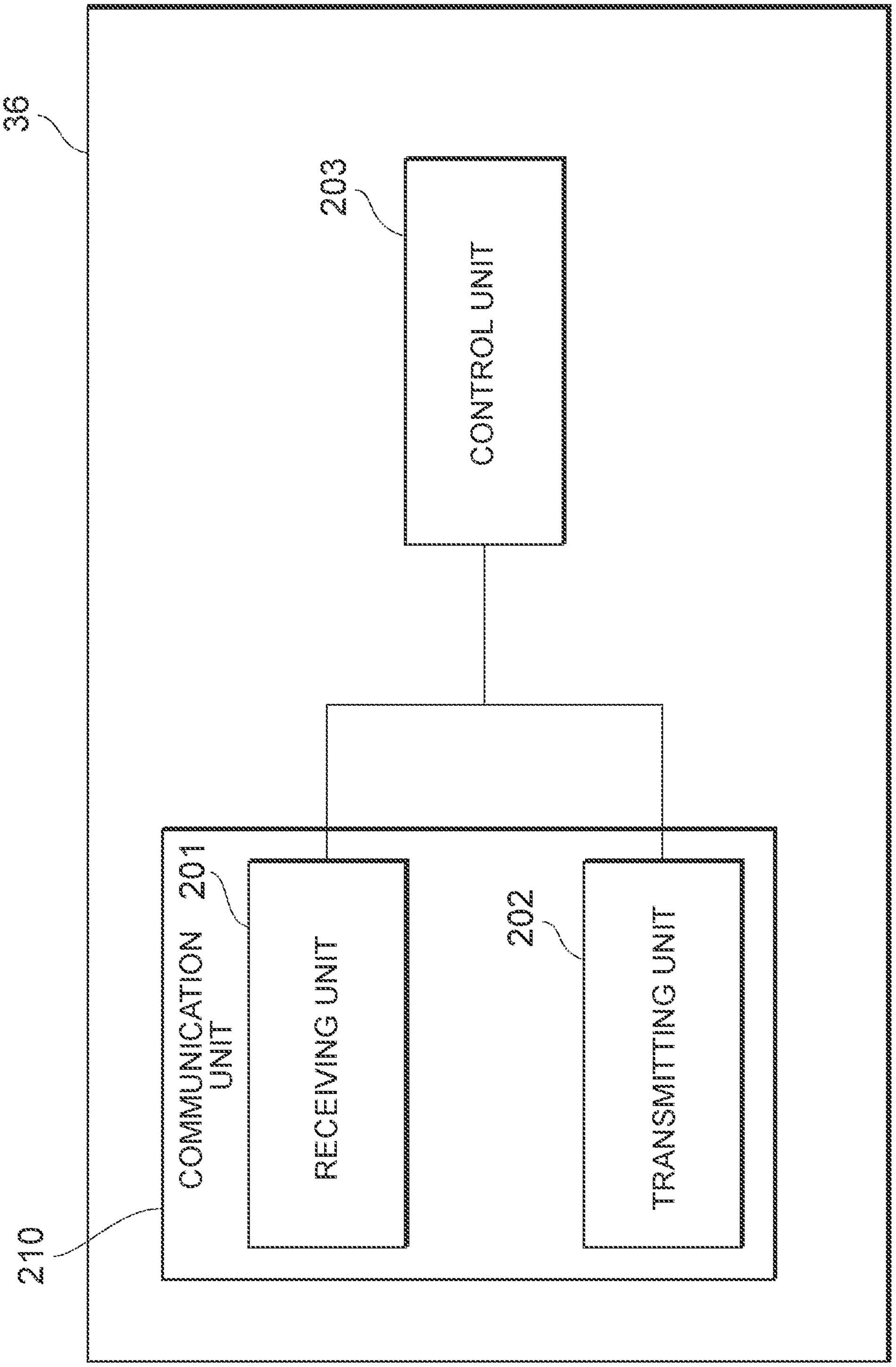
FIG. 11 is a diagram illustrating an example of the functional block configuration of a core network device according to the present embodiment.

FIG. 11 is a diagram illustrating an example of the functional block configuration of a core network device according to the present embodiment. In FIG. 11, the functional block configuration of the NEF/MBSF 36 is illustrated, but any other core network device having a function other than that of the NEF/MBSF 36 may also have a similar functional block configuration. The NEF/MBSF 36 includes a receiving unit 201, a transmitting unit 202, and a control unit 203. Further, the receiving unit 201 and the transmitting unit 202 are collectively called a communication unit 210.

Note that all or some of the functions implemented by the receiving unit 201 and the transmitting unit 202 can be realized by using the communication device 13. Further, all or some of the functions implemented by the receiving unit 201 and the transmitting unit 202, and the function of the control unit 203 can be realized by the processor 11 executing a program stored in the storage device 12. Further, the program can be stored on a storage medium. The storage medium with the program stored thereon may be a non-transitory computer readable medium. The non-transitory storage medium is not particularly limited but may be a storage medium such as a USB memory or a CD-ROM.

The communication unit 210 transmits and receives various messages to and from other CNs 30. The receiving unit 201 receives various messages from other CNs 30. The transmitting unit 202 transmits various messages to other CNs 30.

Further, upon configuring the MBS session, when receiving, from the NRF 42, information indicating that it is necessary to make an interact regarding the MBS policy to the PCF 39 that controls the policy concerned, the communication unit 210 transmits, to the MB-SMF 34, a message for requesting the allocation of the TMGI or a message for requesting the creation of the MBS session including PCF usage information. Further, upon configuring the MBS session, when receiving, from the NRF 42, information indicating that it is not necessary to make the interact regarding the MBS policy to the PCF 39 that controls the policy concerned, the communication unit 210 transmits, to the MB-SMF 34, a message for requesting the allocation of the TMGI or a message for requesting the creation of the MBS session without including PCF usage information (step S131 in FIG. 5, S191 in FIG. 6).

The control unit 203 performs various controls related to the function implemented by the NEF/MBSF 36.

Summary

As described above, according to the communication system 1 of the present embodiment, when it is necessary to interact with the PCF 39 regarding the MBS policy, the MB-SMF 34 identifies a PCF 39 to acquire the MBS policy from the identified PCF 39. This makes it possible to perform policy control properly in multicast and/or broadcast communication. Further, the MB-SMF 34 transmits PCF identification information of the identified PCF 39 to the NEF/MBSF 36. Thus, since the NEF/MBSF 36 can omit processing for making an interact regarding PCF identification information to the BSF 40, the consumption of network resources can be reduced.

Supplementary Information

The term of "function" in the above embodiment may be replaced with "device." The fact that the "MBS policy is queried to the PCF 39" may be replaced with the fact that the "MBS policy is acquired from the PCF 39."

Various signals, information, and parameters in the above embodiment may be signaled by any layer. In other words, the various signals, information, and parameters mentioned above may be replaced with signals, information, and parameters of any layer, such as a higher layer (for example, Non Access Stratum(NAS) layer, RRC layer, or MAC layer), or a lower layer (for example, physical layer). Further, the notice of given information is not limited to an explicit notice, which may also be an implicit notice (for example, without notifying the information or using other information).

Further, the names of the various messages, signals, information, and parameters in the above embodiment are just illustrative examples, and the names may be replaced with other names.

The format of various information is not limited to that in the aforementioned embodiment, and it may be changed accordingly such as to bit representation (0 or 1), Boolean (true or false), integer values, or characters. Further, the singular and the plural in the aforementioned embodiment may be mutually changed.

The embodiment described above is to facilitate the understanding of the present disclosure, and it is not intended to limit the interpretation of the present disclosure. The flowcharts or the sequences described in the embodiment, and the alignment and arrangement of respective elements, indexes, conditions, and the like included in the embodiment are not limited to those exemplified, and can be changed accordingly. Further, at least some of components described in the aforementioned embodiment can be partially replaced or combined.

What is claimed is:

1. A processing method of a core network device which manages a multicast/broadcast service (MBS) session, the processing method comprising:

- receiving an MBS session request message from an Application Function (AF) by a Network Exposure Function/Multicast Broadcast Service Function (NEF/MBSF);
- interacting with a Network Repository Function (NRF) based on the MBS session request message to discover a Multicast Broadcast-Session Management Function (MB-SMF) by the NEF/MBSF;
- sending a message requesting creation of an MBS session to the MB-SMF by the NEF/MBSF;
- interacting with the NRF based on the message requesting the creation of the MBS session to discover a Policy Control Function (PCF) by the MB-SMF;
- sending a request message regarding an MBS policy to the PCF by the MB-SMF;
- receiving a response message regarding an MBS policy from the PCF by the MB-SMF; and
- sending a message requesting a reservation of resources for transmitting MBS data to a terminal based on the response message regarding the MBS policy to a Multicast Broadcast-User Plane Function (MB-UPF) by the MB-SMF.

2. The processing method according to claim 1, further comprising updating a Network Function (NF) profile of the NRF after discovering the PCF by the MB-SMF.

3. A terminal configured to receive MBS data using resources reserved in the MB-UPF by the processing method of the core network device according to claim 1.

* * * * *